July 28, 1959     O. L. NORDIN     2,896,502
COLORIMETER APPARATUS
Filed May 7, 1956     3 Sheets-Sheet 1
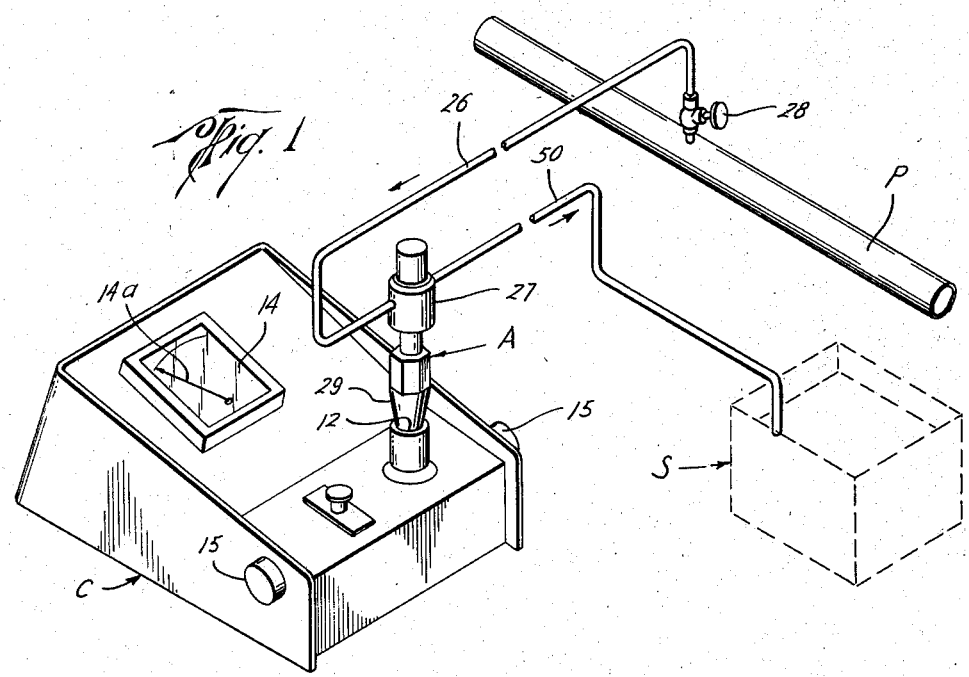
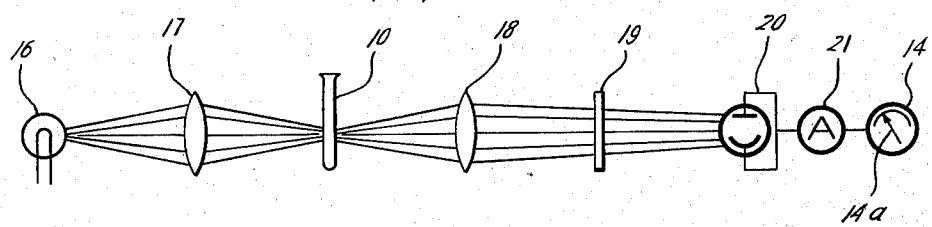
Obert L. Nordin
INVENTOR.
BY J. Vincent Martin
Joe E. Edwards
B. R. Pravel
ATTORNEYS

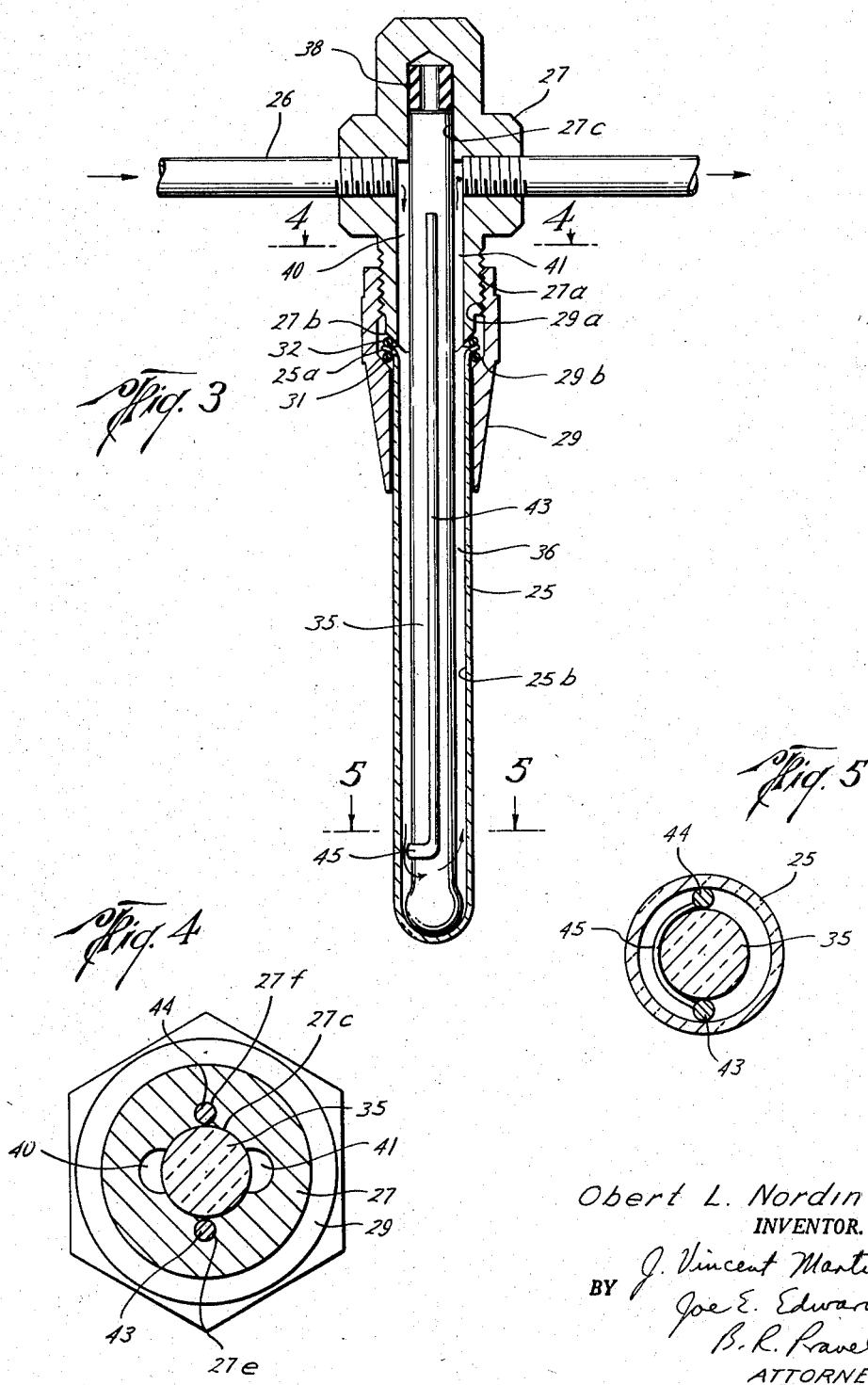

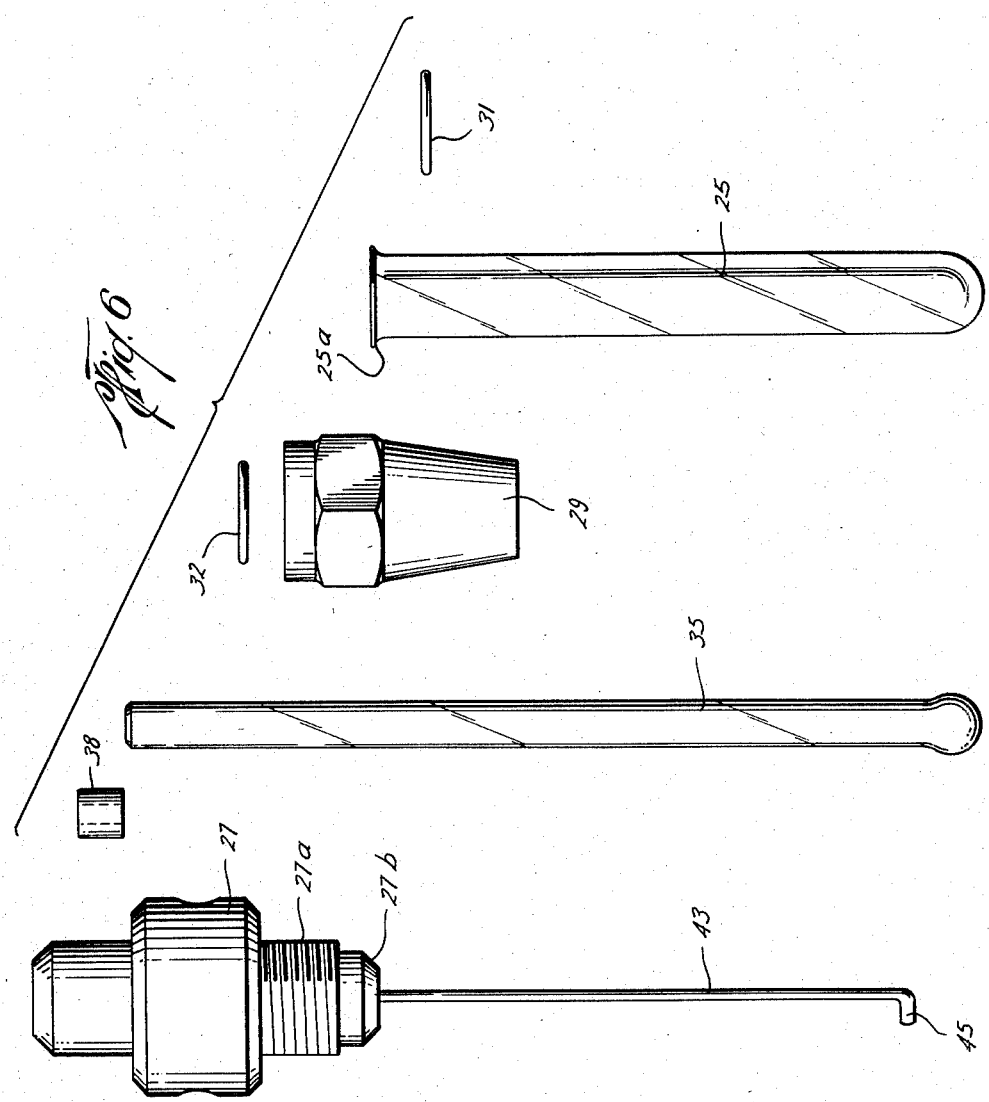

United States Patent Office 2,896,502
Patented July 28, 1959

2,896,502

COLORIMETER APPARATUS

Obert L. Nordin, Houston, Tex., assignor to Thornhill-Craver Company, Inc., Houston, Tex., a corporation of Texas Application May 7, 1956, Serial No. 583,152

4 Claims. (Cl. 88—14)

This invention relates to new and useful improvements in colorimeter apparatus.

An object of this invention is to provide a new and improved colorimeter apparatus for providing a continuous indication of the turbidity of a liquid flowing through said apparatus.

An important object of this invention is to provide a new and improved colorimeter cell assembly for use with a colorimeter wherein fluid is continuously circulated through said cell assembly for obtaining a continuous indication of the turbidity of such flowing fluid with said colorimeter.

Another object of this invention is to provide a new and improved colorimeter apparatus which includes a colorimeter and a colorimeter cell assembly therewith, and wherein said cell assembly is connected to a pipeline for directing a portion of the fluid flowing therethrough into said cell assembly whereby a continuous sample of the fluid from the pipeline is provided in the cell assembly for obtaining a continuous indication of the turbidity of the pipeline fluid with said colorimeter.

A further object of this invention is to provide a new and improved colorimeter cell for use with a colorimeter wherein means are provided in the cell for directing the flow of a sample fluid in the cell in such a manner that the dirt and other color-absorbing particles in the fluid are continuously removed with the flowing fluid as the turbidity thereof is being indicated on the colorimeter whereby no accumulation of the dirt or other color absorbing particles occurs in the cell.

A still further object of this invention is to provide a new and improved colorimeter cell for use with a colorimeter, wherein such cell is capable of withstanding relatively high fluid pressures.

Still another object of this invention is to provide a new and improved colorimeter cell for use with a colorimeter, and wherein said cell is made from a standard test tube having means therewith for reducing the size of the fluid stream flowing through the cell to thereby reduce the total solids in the cell at any one time; such reduction in the total solids enabling the colorimeter to indicate changes in the turbidity of the fluid even though such turbidity is relatively high.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

Figure 1 is an isometric view illustrating the colorimeter apparatus of this invention in position for use with a pipeline.

Figure 2 is a schematic illustration of the colorimeter which is preferably used with the cell assembly of this invention.

Figure 3 is a vertical sectional view, partly in elevation, illustrating the colorimeter cell of this invention.

Figure 4 is a horizontal sectional view taken on line 4—4 of Figure 3.

Figure 5 is a horizontal sectional view taken on line 5—5 of Figure 3.

Figure 6 is an exploded view of the various parts of the colorimeter cell assembly of this invention.

In the drawings, the letter A designates generally the colorimeter cell assembly of this invention which is adapted to be used with a colorimeter C of conventional construction. As will be explained in detail, the colorimeter cell assembly A is connected with a source of flowing fluid such as a pipeline P so that a continuous sample of the fluid flowing in such pipeline P is passed through the colorimeter cell assembly A for obtaining a continuous indication of the turbidity of the fluid with the colorimeter C. After the fluid has passed through the colorimeter cell assembly A, it is discharged into a sump S, as shown in Figure 1, or it may be returned to the pipeline P.

Considering the invention in detail, it should first be noted that the colorimeter C is of a known construction for use with a test cell 10 (Figure 2). In the conventional use of the colorimeter C, the test cell 10 has a fluid sample placed therein and then the test cell 10 is placed in the receptacle or opening 12 in the body of the colorimeter C so that an indication of the turbidity of the sample in the test cell 10 is obtained with the indicator 14. As is well known, suitable controls such as illustrated by the control knobs 15 are provided with the usual colorimeters such as the colorimeter C so that the indicator 14 is properly adjusted to the zero position initially with a clear sample of fluid, whereby subsequent samples having dirt or other light-absorbing materials therein cause the needle 14a to indicate the extent of the light absorbance or turbidity.

The primary components of the colorimeter C are schematically illustrated in Figure 2, wherein the light source 16 which is generally a tungsten lamp directs a light beam through a first lens 17 and then through the test cell 10 which is positioned in the receptacle or opening 12. Some of the light which is directed to the tube or cell 10 is absorbed by the dirt or other light-absorbing material in the fluid sample, but the light which is passed through the tube 10 is then transmitted through the second lens 18 for transmission through a light filter 19 and is ultimately picked up by the phototube 20. The phototube 20 receives the light and transforms it into an electric signal which is fed to a high-gain amplifier 21 which increases the strength of the electric signal from the phototube and then the amplified signal drives the meter or indicator 14 so that the needle 14a instantly registers the absorption of light by the sample in the test cell 10.

With this invention, the colorimeter cell assembly A is utilized so that instead of employing the batch method of testing a sample in a test cell 10, a fluid sample is continuously tested for its turbidity as it flow from a source of fluid such as the pipeline P. The details of the colorimeter cell assembly A are shown in Figures 3-6. Such assembly A includes a colorimeter cell 25 which may be an ordinary test tube which is cylindrical and which has an open upper end and a closed lower end. For establishing fluid communication between the colorimeter cell 25 and the pipeline P, a flow pipe or tubing 26 is connected to the pipeline P and to a connector head 27. Preferably, a valve 28 is provided in the flow line 26 to control the flow through the line 26 to the connector head 27 and the tube 25, as will be more evident hereinafter. The connector head 27 has an elongated tapered nut 29 releasably connected thereto by the engagement of its threads 27a with the threads 29a on the nut 29.

An annular shoulder 29b is provided on the interior of the nut 29 below the lower inclined end 27b of the connector head 27 so that the upper annular lip 25a is positioned between such shoulder 29b and the end 27b. Seal rings 31 and 32 which are formed of rubber or a similar elastic sealing material are positioned on each side of the annular lip 25a and in sealing engagement therewith and with the shoulder 29b and 27b, respectively. Thus, the colorimeter cell 25 is mounted below the connector head 27 with a fluid-tight seal therebetween. The removable nut 29 is, of course, adjustable for compressing the seal rings 31 and 32 to assure the fluid-tight seal. Also, the nut 29 is removable when it is desired to remove the cell 25 from the connector head 27. The nut 29 fits within the receptacle or opening 12 to prevent the exposure of the cell 25 to exterior light during use. Additional flexible sealing (not shown) may also be used around the nut for such purpose.

A transparent rod 35 which is preferably solid and which has a cylindrical external surface is positioned within the inner surface or bore 25b of the colorimeter cell 25 so as to form an annular space 36 between the external surface of the rod 35 and the inner surface or bore 25b of the colorimeter cell 25. The rod 35 is preferably formed of glass, but it may be formed of other transparent materials. With the colorimeter cell 25 assembled, as shown in Figure 3, the transparent rod 35 extends from the lower end of the cell 25 throughout the full length of the cell 25 and also upwardly into the bore 27c. The upper end of the rod 35 engages a resilient sleeve or cushioning member 38 which is positioned in the bore 27c. Such sleeve 38 is formed of rubber or other resilient elastic material and it provides a sufficient resilience to maintain the rod 35 in constant engagement with the lower end of the cell 25 but without applying a sufficient force thereto to cause any cracking or other damage to the cell 25.

It should be noted that the bore 27c (Figure 4) is the same diameter throughout its length, but side channels 40 and 41 provide for passages on each side of the rod 35 which are in fluid communication with the interior of the cell 25.

A baffle is provided by longitudinally extending baffle rods 43 and 44 which are interconnected at their lower ends by a U-shaped saddle 45. The upper ends of the baffle rods 43 and 44 are press-fitted into recesses or openings 27e and 27f, respectively. Thus, the upper ends of the tubular rods 43 and 44 are spaced diametrically opposite from each other and they are held against the downward movement with respect to the connector head 27 by the press-fit into the openings 27e and 27f, respectively. The lower ends of the baffle rods 43 and 44 are maintained in a diametrically-opposed position by the saddle 45 which substantially conforms to one half of the cylindrical external surface of the rod 35. The portions of the tubular baffle rods 43 and 44 which extend below the connector head 27 are in engagement with the external surface of the rod 35 and the internal surface of the cell 25 so that they divide the annular space 36 along a line extending through the center of the rod 35 and the tube 25. It will be noted that the lower ends of the baffle rods 43 and 44 terminate at a point which is short of the lower end of the tube 25 so as to leave a fluid passage at the lower end of the tube 25 through which fluid can pass from one side of the baffle rods 43 and 44 to the other side thereof. By providing fluid circulation at the lower end of the cell 25, the deposit or accumulation of dirt or other solids from the fluid is prevented. It should be noted that the saddle 45 is positioned on the side of the rod 35 which is contacted by the fluid flowing from the inlet line 26, as will be more fully explained, so that a fluid force is applied to the saddle 45 maintaining same in a seated position (Figures 3 and 5). Other means could, of course, be provided for mounting the baffle rods 43 and 44, but with the baffle rods 43 and 44 constructed as illustrated in the drawings, the assembly and reassembly of the colorimeter assembly A is facilitated, as is believed evident from an an inspection of Figure 6.

It should also be understood that the transparent rod 35 not only functions together with the baffle rods 43 and 44 to provide a baffle so as to direct fluid flow downwardly into the test cell 25 and then upwardly and out of such cell 25, but the rod 35 also reduces the size of the fluid stream flowing through the cell 25 at any one time. By so reducing the size of the fluid stream passing through the cell 25, the total solids in the cell at any one time is also reduced. Such reduction in the total solids enables the colorimeter C to indicate changes in the turbidity of the fluid flowing in the cell 25 even though such turbidity is relatively high and the changes in such turbidity would not otherwise be detected if the entire cell were filled with the fluid. In other words, if the rod 35 were not employed, with the fluids having a very high amount of solids or other light-absorbing materials therein, the indicator 14 would read at a maximum value and any changes in the amount of the solids or other light absorbing materials in the fluid would not be indicated by the indicator 14 since the amount of total solids present in the cell 25 would exceed that amount for which the meter or indicator 14 is calibrated. Therefore, by reducing the size of the stream in the cell 25 with the insertion of the transparent rod 35, the fluid may still flow through the cell 25, but the thickness of the fluid through which the light must pass is reduced and therefore the amount of light absorbed is reduced so that the indicator needle 14a is normally at some intermediate point on the meter 14 and therefore any increases or decreases in the quantity of the solids or other light-absorbing material in the fluid can be indicated by the needle 14a.

Although other means may be provided for reducing the size of the fluid steam which is passed through the light beam from the light source 16 (Figure 2) the construction of the colorimeter cell assembly A of this invention, as illustrated in the drawings, provides a structure which is able to withstand relatively high fluid pressures in the neighborhood of several hundred pounds per square inch pressure and even higher while still obtaining the reduced size of fluid stream. Such strength for withstanding the fluid pressures is obtained primarily because of the cylindrical construction of the cell 25 and the cylindrical glass rod 35 positioned centrally within the cell 25.

The discharge of the fluid flowing out of the cell 25 passes through the channel 41 of the connector head 27 and then flows out through a flow pipe or line 50 which is threaded or otherwise suitably connected to the connector head 27 for discharge into the sump S, or other suitable place. Since it is ordinarily desirable to return the fluid to the pipeline P, a suitable pump (not shown) is usually connected to the sump S for delivering the fluid back to the pipeline P.

In the use or operation of the colorimeter apparatus described above, the meter 14 is first adjusted with the control knobs 15 or the like in the known manner so as to position the needle 14a on the zero point of the scale on the indicator 14. Prior to the time that the valve 28 is opened and prior to the time that fluid is directed from the pipeline P to the colorimeter cell assembly A, a clear sample of the fluid in the pipeline P is placed in the colorimeter cell 25 and the needle 14a is adjusted to the zero position. The colorimeter cell assembly A is, of course, assembled as shown in Figure 3 at the time such setting of the indicator or meter 14 is accomplished. Thereafter, the colorimeter cell assembly A is connected to the pipeline P and the valve 28 is opened to direct a predetermined amount of fluid from the pipeline P through the assembly A. The fluid from the pipeline P flows through the flow line or pipe 26 and is directed through the channel 40 downwardly into the annular space 36 between the external surface of the transparent rod 35 and the internal surface of the cell 25. The rod 35, together with the baffle rods 43 and 44 direct the fluid downwardly into the cell 25 to substantially the lower end of the cell 25 so that the stream of fluid is actually directed below the saddle 45 to provide a fluid circulation at the lower end of the cell 25 for the removal of all solids from the cell 25. The fluid stream then moves upwardly on the other side of the transparent rod 35 and the baffle rods 43 and 44 and is directed through the channel 41 in the connector head 27 and out of the discharge pipe or line 50. The fluid flows into the sump S from the discharge line 50, as previously explained.

The cell 25 is positioned in the receptacle 12 during the flow of the fluid therethrough. Therefore, the beam of light from the light source 16 passes through the cell 25 in the same manner as previously explained in connection with Figure 2 wherein the test cell 10 is shown. Of course, the colorimeter cell 25 is placed in the position of the test cell 10, as schematically illustrated in Figure 2. Thus, the solids such as dirt and other color-absorbing particles absorb a portion of the light from the light source 16 and the extent of the light absorbance is indicated by the indicator 14. As the amount of dirt or other solids in the fluid flowing through the colorimeter cell 25 fluctuates or changes, such fluctuations or changes are indicated on the indicator or meter 14. Therefore, a continuous indication of the turbidity of the fluid flowing through the pipeline P is obtained.

It is believed evident that the cell assembly A is readily disassembled and reassembled for cleaning or other purposes. By unthreading the nut 29 from the connector head 27, the cell 25 and the bars therein are released from the assembly. Thus, the interior of the cell can be readily cleaned and also all of the other parts, including the baffle rods 43 and 44, and the transparent rod 35, can be readily cleaned.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A colorimeter cell assembly for use with a colorimeter comprising a tubular transparent test cell closed at one end and open at the other end, a solid transparent rod in the cell and extending the length thereof, baffle means between the cell wall and rod on opposite sides of the rod extending from the open end of the tube to a point adjacent the closed end of the tube to direct fluid in a confined U-shaped path through the tube, and means for directing fluid into and out of the cell on opposite sides of the baffle means.

2. The combination with a colorimeter including a receptacle having a closed end and an open end for receiving a test cell, means for passing a beam of light through said receptacle and said cell, and indicator means for indicating the turbidity of a fluid in the test cell, of a tubular colorimeter cell having a closed end and an open end adapted to be positioned in said receptacle, said colorimeter cell having means for directing a stream of fluid into and out of said cell comprising a central transparent rod extending longitudinally for the full length of said cell, and baffle means extending longitudinally in said cell between the external surface of said transparent rod and the internal surface of said cell to direct said fluid stream into said cell along one side of said rod and said baffle and out of said cell along the other side of said rod and said baffle whereby the size of the stream is reduced by the presence of the rod to reduce the total solids in the cell at any one time so that indications of changes in the turbidity of the fluid are obtained even though the turbidity is such that the indicator means would not detect such changes if the entire cell were filled with the fluid.

3. A colorimeter cell assembly for use with a colorimeter comprising, a tubular transparent test cell closed at one end, a solid tubular transparent rod within and extending lengthwise of the cell, baffle means between the cell wall and rod on opposite sides of the rod and spaced from said closed end of the tube to direct fluid in a confined U-shaped path through the tube, and means for directing fluid into and out of the cell on opposite sides of the baffle means.

4. The combination with a colorimeter including a receptacle having a closed end and an open end for receiving a test cell, means for passing a beam of light through said receptacle and said cell, and indicator means for indicating the turbidity of a fluid in the test cell, of a colorimeter cell assembly comprising, a tubular transparent test cell closed at one end, a solid tubular transparent rod within and extending lengthwise of the cell, baffle means between the cell wall and rod on opposite sides of the rod and spaced from said closed end of the tube to direct fluid in a confined U-shaped path through the tube, and means for directing fluid into and out of the cell on opposite sides of the baffle means.

References Cited in the file of this patent

UNITED STATES PATENTS

| | | |
|---|---|---|
| 1,417,530 | Kendall et al. | May 30, 1922 |
| 1,717,702 | Exton | June 18, 1929 |
| 2,066,934 | Gulliksen | Jan. 5, 1937 |
| 2,301,401 | Hennessy et al. | Nov. 10, 1942 |
| 2,481,882 | Sebald et al. | Sept. 13, 1949 |
| 2,562,181 | Frommer | July 31, 1951 |

FOREIGN PATENTS

| | | |
|---|---|---|
| 25,668 | Great Britain | of 1904 |